United States Patent [19]

Cunningham

[11] 4,134,015

[45] Jan. 9, 1979

[54] SYSTEM FOR MEASURING THE REFLECTANCE OR EMITTANCE OF AN ARBITRARILY CURVED SURFACE

[76] Inventor: Charles R. Cunningham, 11148 Rainier Ave. S., Seattle, Wash. 98178

[21] Appl. No.: 798,658

[22] Filed: May 19, 1977

Related U.S. Application Data

[63] Continuation-in-part of Ser. No. 699,382, Jun. 24, 1976, abandoned.

[51] Int. Cl.$^2$ .............................................. G01J 1/00
[52] U.S. Cl. ............................... 250/341; 250/358 R; 250/495
[58] Field of Search .................... 250/341, 358 R, 495; 73/355 EM

[56] References Cited

U.S. PATENT DOCUMENTS 3,069,893  12/1962  Kerstetter ........................... 250/341

OTHER PUBLICATIONS

"Determining Emissivity" by Burton Bernard, vol. 37 #5 Instruments and Control Systems May 1964 pp. 87-89.

*Primary Examiner*—Harold A. Dixon
*Attorney, Agent, or Firm*—Seed, Berry, Vernon & Baynham

[57] ABSTRACT

A system for locally measuring the surface reflectance and emittance of mainly opaque objects of arbitrary size, shape and curvature. The basic component is a measurement head having a radiation enclosure consisting of surfaces which are uniquely related by a set of mathematical equations relating their relative view of one another. One surface is a pair of radiation emitters. The second surface is a measurement device positioned directly adjacent a third surface which is open to accommodate the local area on an arbitrarily shaped test object. Radiant energy from the emitters is reflected from the surface of the object to the measurement device. Since the intensity of the radiant energy emitted is relatively constant the intensity of the energy incident on the measurement device is proportional to the reflectance of the surface on the object under test which wholly or partially blocks the open third surface of the radiation enclosure. The radiation enclosure is configured such that direct radiation from the emitter surface to the measurement device surface is blocked, and virtually all of the energy received by the measurement device is energy reflected from the region viewed of the object under test. The emissometer/reflectometer head has fourth and fifth surfaces which are included in the uniquely related mathematical formulation and assist in directing the emitted radiant energy to the test object and the measurement device, and in ventilating the whole enclosure.

10 Claims, 2 Drawing Figures

SYSTEM FOR MEASURING THE REFLECTANCE OR EMITTANCE OF AN ARBITRARILY CURVED SURFACE

CROSS REFERENCE TO RELATED APPLICATIONS

This is a continuation-in-part to abandoned application Ser. No. 699,382, filed June 24, 1976, now abandoned.

BACKGROUND OF THE INVENTION

1. Field of the Invention

This invention relates to devices for measuring the emittance or reflectance of a surface and, more particularly, for measuring the relative emittance or reflectance of an arbitrarily sized plane or curved surface with respect to a pair of known standards.

2. Description of the Prior Art

When electromagnetic energy strikes a material the electromagnetic energy is either reflected from the surface of the material, absorbed by the material or transmitted through the material. For opaque materials none of the incident energy is transmitted through the material so that the ratio of energy reflected (the reflectance $\rho$) plus the ratio of the energy absorbed by the material (the absorptance $\alpha$) always equals unity. $\alpha + \rho = 1$. For transparent or translucent materials the ratio of the energy transmitted (the transmittance, $\tau$) plus the reflectance and the absorptance always equals unity. $\alpha + \rho + \tau = 1$. All materials emit electromagnetic energy, and the intensity of the electromagnetic energy emitted is a function of the temperature of the material. The relative ability of a material to emit electromagnetic energy is termed "emittance, $\epsilon$" which is the ratio of the radiant energy emitted by the object and the radiant energy emitted by a perfect radiator or "black body" at the same temperatures. By Kirchhoff's law when an object is at thermal equilibrium the absorptance is equal to the emittance. $\epsilon = \alpha$ In other words, a surface which easily absorbs energy, such as a darkly colored surface, also easily emits energy. On the other hand, a surface which has a low absorptance, such as a shiny metallic surface, also has a low emittance. Since the emittance, reflectance and absorptance of an object are related functions, a measurement of one physical property is easily translated into a measurement of the remaining physical properties.

In military or civilian manufacturing and procurement it is often specified that the surface of an object must have a specific narrow emittance range. The emittance may be selected by such techniques as painting, electroplating, taping, coating and machining. In the design of an apparatus suitable for measuring temperatures, in spacecraft coatings used to control temperatures, and generally in any apparatus where thermal conditions are influenced by heat transfer through radiation, it is essential to know and control the emittance of various surfaces involved.

Various types of devices for measuring emittance or reflectance are available on the market. Most of these devices are generally relatively inaccurate, not conveniently portable, are complex and time consuming to set up for use, and often require an extended period of time to complete the measurement. Furthermore, many of these devices are only capable of measuring the emittance of planar surfaces and thus are not suitable for measuring the surface emittance or reflectance of many products. The most common variety of devices for measuring the emittance of a surface performs the measurement by heating the object under test to a predetermined temperature and measuring the emittance by utilizing the known relation that the energy emitted is proportional to the emittance times the fourth power of the temperature of the test sample. Such devices are incapable of making a measurement until the temperature of the object has stabilized. As a result a relatively long period is often required to make the measurement, and measurements on large objects are sometimes impossible since too much heat is often dissipated for their temperatures to stabilize at a relatively high value. Furthermore, a lot of these current devices require additional quantitative measurements of the temperature of the surface under test or some other reference surface which requires additional circuit complexities, and could also cause damage to the surface under test.

SUMMARY OF THE INVENTION

It is an object of the invention to provide a very adaptable device for measuring the emittance and reflectance of local surfaces of an object which may have a wide variety of size and arbitrary curvatures.

It is another object of the invention to provide a simple to operate and portable field versus laboratory device capable of obtaining accurate measurements within a relatively short period of time.

It is still another object of the invention to provide a device which is capable of making accurate measurements without requiring additional quantitative measurements of the temperature of the surfaces of the test object, or any other reference surfaces.

These and other objectives of the invention are accomplished by an emittance reflectometer system including an air cooled measurement head having a radiation enclosure of mathematically related surfaces which are all relatively isothermal except for a radiation emitter surface which is much hotter than all other surfaces. The emitter surface and measurement device surface are positioned directly adjacent an open surface which accommodates a region of the object under test which blocks part or all of the open surface of the radiation enclosure so that radiant energy from the emitter surface reflects from the object onto the measuring device. The emitter surface and the measurement device surface are blocked from view of one another so that all of the energy incident on the measurement device is energy reflected from the test object placed at the open surface. The emitter surface directly views the test sample placed at the open surface. The measurement device surface is designed to equilibriate thermally in a minimum period of time for a given step input in reflected radiant heat flux which occurs when a test sample is placed at the open surface of the measurement head. Except for the emitter surface, all parts of the measurement head are passively maintained nearly isothermal and at a relatively low temperature by air convection high surface area cooling fins. This enables a technician to handle the measurement head for convenience and without injury. This isothermal feature also effectively reduces to a negligible order of magnitude any stray radiant energy not originating from the hotter emitter surfaces.

DETAILED DESCRIPTION OF THE INVENTION

Figure 1:
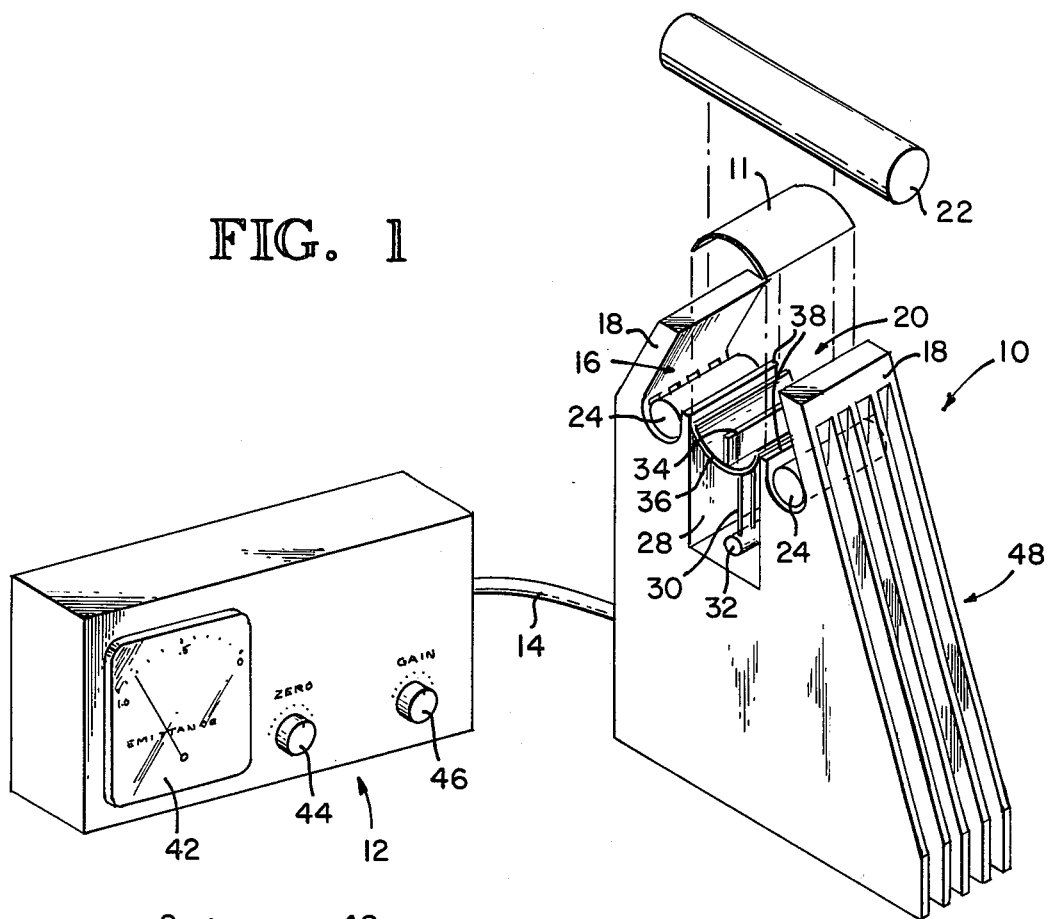
FIG. 1 is an isometric view of the system for measuring emittance and reflectance including a measurement head connected to a calibration and indication device.

The system for measuring the reflectance and emittance of an arbitrarily sized and curved surface includes a measurement head 10 connected to a calibration and indicating device 12 through a set of conductors 14. The measurement head 10 has the general shape of a truncated triangle with a radiation enclosure 16 formed at the truncated apex of the triangle. As illustrated in further detail in FIG. 2, the radiation enclosure is integrally formed by a pair of protruding symmetric sidewall surfaces 18 near or at the opening of which the local region of an object 22 to be tested is placed in order to make the measurements. The opening 20, is also considered a surface of the enclosure. A pair of symmetric radiation emitter surfaces 24 of conventional design are placed adjacent the symmetric sidewalls 18. The wavelength of the energy emitted by the emitters 24 depends upon the temperature of the emitters 24. By adjusting this temperature a good approximation of the monochromatic reflectance or emittance of an object can be measured. The center portion of the measurement head 10 contains a slotted and ventilated recess 28 for receiving a measurement device such as a thermopile 30 consisting of a cold or first dissimilar metal junction 32, which is air cooled and does not touch the measurement head, and a hot or second dissimilar metal junction 34 projecting toward the open surface 20, of the radiation enclosure where a test sample 22 is usually placed. The second set of junctions 34 is integral with and connected to the transverse collection surface 36 of the radiation enclosure which absorbs radiant energy reflected from the surface of the sample 22 to conduct and emit, as it subsequently warms, to the thermopile junctions 34. The radiation emitters 24, are blocked from a direct view of the collector surface 36 by the protruding measurement head structures 38. However, the emitter surface directly views the opening surface of the radiation enclosure where a test object will be placed. With a test object in place 22, directly emitted radiation from the emitter surface 24 is reflected by the local surface of the sample 22 onto the collection surface 36. The emitters 24, occupy a relatively large angular region on opposite sides of the collector surface, and are configured to emit a relatively wideband sweep of radiant energy in a symmetric pattern so that the measured emittance or reflectance is nearly directionally independent. This feature, combined with the fact that the final measurement is based on adjustments utilizing standards 40 of known normal and/or hemispherical emittance gives a relative measure of either normal or hemispherical emittance.

The output of the thermopile 30 is a voltage proportional to the intensity of the radiant energy incident on the collector surface 36. The calibration and measurement device 12 which receives the thermopile output through conductor set 14 includes a meter 42 calibrated in reflectance or emittance. The device 12 also includes a zero adjustment potentiometer 44 and a gain adjustment potentiometer 46. As explained hereinafter, the potentiometers 44, 46 are adjusted during the calibration phase of the measurement when known reflectance or emittance standards 40 are placed on the test object 22 at the opening 20 of radiation enclosure 16. The calibration and indication device 12 may be implemented by a variety of techniques such as by driving the meter 42 with an amplifier having a variable offset as controlled by the zero potentiometer 44 and a variable gain as controlled by the gain potentiometer 46.

The measurement head is preferably fabricated from metal with a plurality of cooling fins 48 integrally formed along each side of the head 10 capable of removing the heat absorbed by the head from the radiation emitters 24. The emitter surface 24 is maintained much hotter than all other surfaces 18, 20, 26, and 36; where surface 26 is just the side opening in the radiation enclosure which allows surrounding cool air to freely circulate and ventilate the region. Then a test sample 22 is placed at the open surface 20, reflected radiant energy emitted by surface 24 causes the collector surface 36 of the measurement device to increase slightly in temperature relative to the cold junction 32.

Figure 2:
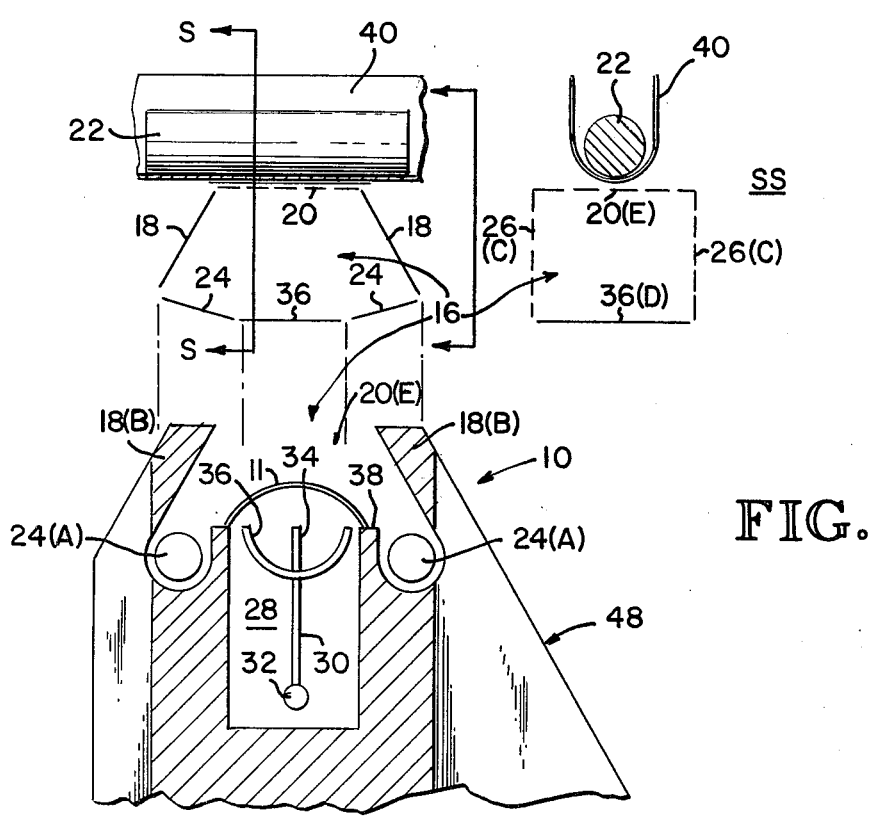
FIG. 2 is a side elevational view of the measurement head illustrating the radiation enclosure in greater detail.

However, the integral hot junction and collector surface, 34, 36, can fluctuate in temperature by the same magnitudes as mentioned above due to intermittent outside air currents such as breathing by the technician who is operating the instrument or by location of the instrument in a room near a thermostatically controlled heating/ventilating outlet. To reduce this problem to an acceptable level, a transparent air current barrier, 11, is placed over the integral measurement surface, 34, 36, as shown in FIGS. 1 and 2.

The cold junction 32 is also air cooled to ambient conditions in its ventilated cavity 28 but remotely located from any heat sources such that its temperature does not change. Thus a constant equilibrium temperature difference is established between cold 32 and hot 34, 36 junctions which generates an electrical signal proportional to the reflectance or emittance of the object 22 under test.

The design of the radiation enclosure 16 has been optimized by analysis employing the Oppenheim network technique more fully described in the reference: *Radiation Analysis by the Network Method* by A. K. Oppenheim, Transactions of the A.S.M.E., pp. 725–735, May, 1956. Trade studies were conducted employing equations (13) and (14) described in the above reference. These equations are identically combined below in Hottel's more familiar form:

$$A_i F_{ij} = \frac{A_i A_j}{\rho_i \rho_j} \epsilon_i \epsilon_j \left( \frac{-D_{ij}}{D} \right)$$

in which D is the determinant of the coefficient matrix of radiation balances on all surfaces, and $D_{ij}$ is the cofactor of its i-th row and j-th column. A's, $\rho$'s, and $\epsilon$'s are respective areas, emittances, and reflectances of the surfaces in the enclosure.

The above equation was utilized to evolve the unique mathematically related relative geometries of all five primary surfaces 18, 20, 24, 26, and 36, in the radiation enclosure 16. General analyses based on the above equation are advanced but standard in the industral heat transfer. Such analyses of the radiation enclosure 16 were complex, thus only initial objectives and final design features are described. The purpose of presenting the above equation is to show that the design of the radiation enclosure 16 evolved from rigorous technical analyses utilizing advanced but proven state of the art methodology.

In the trade studies employing the Oppenheim method, the primary design objective was the attainment of a radiation enclosure geometric arrangement and corresponding internal surface emittance treatment that would effect an order of magnitude change in the intensity of radiant energy flux incident on the collection surface 36 when the emittance or reflectance of the surface of the object under test 22 varies between near zero and near unity. This primary design objective is achieved by the configurations shown in FIGS. 1 and 2. A fundamental design result in achievement of this primary objective leads to an optimized electronic signal conditioning system for synthesis of response to the actual variation, near zero to near unity, in the physical parameter, emittance, under study.

The surfaces of the reflection cavity 16 are mathematically related by precisely selected geometric view factor conservation equations. The "view factor", $F_{ij}$, is a term used in the science of radiation heat transfer to represent the fraction that one surface (surface i) views or sees of another surface, (surface j) of an enclosure. The term "enclosure" consists of the number of significant surfaces involved in the analysis. The surfaces of the radiation enclosure 16 are mathematically related by the following geometric view factor conservation equations:

| | | | | | |
|---|---|---|---|---|---|
| $F_{AA}$ (0) | $F_{AB}$ (.32) | $F_{AC}$ (.48) | $F_{AD}$ (0) | $F_{AE}$ (.20) | = 1 |
| $F_{BA}$ (.24) | $F_{BB}$ (.43) | $F_{BC}$ (.14) | $F_{BD}$ (.08) | $F_{BE}$ (.11) | = 1 |
| $F_{CA}$ (.36) | $F_{CB}$ (.14) | $F_{CC}$ (.07) | $F_{CD}$ (.18) | $F_{CE}$ (.25) | = 1 |
| $F_{DA}$ (0) | $F_{DB}$ (.17) | $F_{DC}$ (.36) | $F_{DD}$ (0) | $F_{DE}$ (.47) | = 1 |
| $F_{EA}$ (.20) | $F_{EB}$ (.15) | $F_{EC}$ (.34) | $F_{ED}$ (.31) | $F_{EE}$ (0) | = 1 |

Symmetric surfaces are referred to as a single surface. Thus, surface A represents a pair of symmetrically situated radiation emitters 24. Surface B represents a pair of symmetrically situated solid metal sidewalls 18. Surface C is a pair of symmetrically situated sidewall boundaries which are open for ventilation of the cavity 16. Surface D can be thought of as the planar projection of the integral hot junction 34 and 36 surface of measurement device 30 which is directly viewing surface E. Surface E is an opening 20 in the reflection cavity 16, but its purpose is to accommodate all or part of the surface of an object to be tested 22. Values of the view factors are listed in parentheses in the above formula below each view factors. It should be noted that these specific values could vary somewhat without appreciably affecting the design.

The local surface of the test object 22 measured by the head 10 may have a wide variety of curvatures. In size, the only requirement is that the test object 22 be large enough to get a reasonable near zero and near unity calibration on the indication device, 12. Thus local areas on objects of infinite or very small size relative to the measuring device can be accurately checked. Note that it is not necessary that the surface of the test object completely cover the opening surface 20, of the radiation enclosure. Further, since it is not necessary to raise the temperature of the object 22 the volume of the object 22 can be infinite. In addition, it is not necessary to measure the temperature of the test object or anything else involved.

The collection surface 36 has been engineered to efficiently store and convey energy incident on it and absorbed by it to integral hot junctions 34 of the thermopile 30 in order to maximize the output from, and minimize the response time of, the thermopile 30. The material forming the collection surface 36 has a relatively low thermal capacity and it is treated on its collection surface for high emittance so that virtually all of the energy incident on the surface 36, reflected from the test object 22, is absorbed by the material and easily re-emitted and conducted to the integral hot junctions 34. The opposite side of the material or surface 36 is given a low emittance treatment so that a relatively small amount of energy is emitted from the material to the measurement head. The collection surface 36 is curved to partially enclose the projecting junctions 34 thereby increasing the view factor between the collection surface 36 and the integral hot junctions 34 so that radiation absorbed by the collection surface 36 can be re-radiated or re-emitted to the integral hot junctions 34.

In operation, a high emittance standard 40 covers the surface of the test object 22 placed at the opening 20 of the radiation enclosure and the zero potentiometer 44 is adjusted so that the meter 42 reads near zero reflectivity or near unity emissivity. Next, the high emittance standard 40 is replaced by a low emittance standard, both being a thin sheet of painted and/or metalized plastic or foil, and the gain potentiometer 46 is adjusted so that the meter 42 indicates near unit reflectance or near zero emittance. All standard calibration materials are then removed 40 and the surface emittance or reflectance of the local area of the object 22 is indicated on the meter 42. The foregoing assumes that the object 22 is opaque and the transmittance of the object is zero. Where the sample is transparent or translucent only the reflectance of the object can be measured by the above procedure. However, the emittance of a slightly curved or flat transparent or translucent object can also be measured by making two measurements-- the first one with just the object 22 covering the radiation enclosure 16 and the second one with a highly reflective surface covering the object 22. The increased energy reflected by the object 22 in the second measurement corresponds to the quantity of radiant energy previously transmitted through the object 22 but now reflected by the surface above the object. Since the reflectance and transmittance has now been measured the emittance can be easily determined. Since the operation of the device does not depend upon heating the object to a predetermined temperature, and since the sensor collection surface 36 is of low thermal capacity, the device is able to complete a measurement in a relatively short period of time. Furthermore, the use of highly accurate standards 40 for calibrating the device insures that the subsequent relative test object 22 measurements are extremely accurate.

Only reflected radiant energy is amplified, as related to emitted radiant energy by Kirchhoff's law $\alpha = \epsilon = 1 - \rho$. This principle of operation is valid because the surface of the object 22 under test is at a relatively low temperature nearly equal to that of the measurement device surface 36. Thus there is no requirement to quantitatively measure or make any adjustment for the temperature of the object 22, under test.

I claim:

1. A system for measuring the surface reflectance and emittance on a local region of an object of arbitrary size and shape comprising a measurement head having a radiation enclosure consisting of first and second pairs of spaced sidewalls facing each other; radiation emitting means positioned within said radiation enclosure having an emitting surface; radiation sensing means positioned within said radiation enclosure adjacent said emitting means for generating an electrical signal indicative of the intensity of the radiation incident on a measurement surface; and a measurement aperture formed in said radiation enclosure providing a measurement viewing surface, said viewing surface being in direct view of said measurement surface and said emitting means, said surfaces being related to each other by precisely selected view factor equations such that said emitting means is exposed to itself by a view factor of approximately 0.0, to said first pair of sidewalls by a view factor of approximately 0.32, to said second pair of sidewalls by a view factor of approximately 0.48, to said measurement surface by a view factor of substantially 0.0, and to said viewing surface by a view factor of approximately 0.20; wherein said first pair of sidewalls are exposed to said emitting surface by a view factor of approximately 0.24, to themselves by a view factor of approximately 0.43, to said second pair of sidewalls by view factor of approximately 0.14, to said measurement surface by a view factor of approximately 0.08 and to said viewing surface by a view factor of approximately 0.11; wherein said second pair of sidewalls are exposed to said emitting surface by a view factor of approximately 0.36, to said first pair of sidewalls by a view factor of approximately 0.14, to themselves by a view factor of approximately 0.07, to said measurement surface by a view factor of approximately 0.18, and to said viewing surface by a view factor of approximately 0.25; wherein said measurement surface is exposed to said emitting surface by a view factor of approximately 0.0 to said first pair of sidewalls by a view factor of approximately 0.17, to said second pair of sidewalls by a view factor of approximately 0.36, to itself by a view factor of approximately 0.0, and to said viewing surface by a view factor of approximately 0.47; and wherein said viewing surface is exposed to said emitting surface by a view factor of approximately 0.20, to said first pair of sidewalls by a view factor of approximately 0.15, to said second pair of sidewalls by a view factor of approximately 0.34, to said measurement surface by a view factor of approximately 0.31, and to itself by a view factor of approximately 0.0.

2. The system of claim 1 further including means for measuring the monochromatic reflectance and emittance of said test object by varying the temperature of said emitting surface thereby varying the wave length of radiation generated by said emitting means.

3. The system of claim 1 further including a transparent air current barrier positioned over said measurement surface out of the view of said emitter surface and between said measurement surface and said viewing surface.

4. The system of claim 1 wherein said measurement head further includes convection cooling means for maintaining the temperature of said radiation enclosure and measurement head at substantially ambient temperature while allowing the temperature of said emitting surface to be at a substantially higher temperature.

5. The system of claim 4 wherein the relatively high emitter temperature predominates in the overall radiant energy exchange within the radiation enclosure of claim 1 such that stray radiant energy from any other surface of said radiation enclosure or outside source has a negligible influence on emittance measurements.

6. The system of claim 4 wherein said cooling means comprise a plurality of cooling fins integrally formed in said measurement head.

7. The system of claim 1 wherein said measurement means comprise a thermopile having hot and cold junctions, said cold junction being disposed in an isothermally ventilated slot in said measurement head and located outside of said radiation enclosure such that the temperature of said cold junction is substantially constant.

8. The system of claim 7 wherein said hot junction contacts and is isothermally integral with said measurement surface thereby absorbing radiant energy reflected from said test object such that an electrical signal is generated indicative of the intensity of energy reflected from said test object.

9. The system of claim 1 wherein said radiation emitting means comprise a pair of emitting units spaced apart on opposite sides of said viewing plane and directly exposed thereto such that the radiation striking said test object is relatively diffuse thereby minimizing directional effects on a measurement.

10. The system of claim 1 wherein there is not a requirement for separate temperature measurements, or any quantitative temperature measurements, of said test object, said measurement head, or any of said surfaces of said radiation enclosure in order to complete a measurement of emittance or absorbtance, reflectance and transmittance.

* * * * *